US009686850B2

(12) United States Patent
Girold et al.

(10) Patent No.: US 9,686,850 B2
(45) Date of Patent: Jun. 20, 2017

(54) TRANSFERRED-ARC PLASMA TORCH

(75) Inventors: Christophe Girold, Piolenc (FR); Arnaud Bourgier, Voreppe (FR); Lionel Bruguiere, Saint-Aunes (FR); Florent Lemort, Villeneuve les Avignon (FR)

(73) Assignee: COMMISSARIAT A L'ENERGIE ATOMIQUE, Paris (FR)

( * ) Notice: Subject to any disclaimer, the term of this patent is extended or adjusted under 35 U.S.C. 154(b) by 2096 days.

(21) Appl. No.: 12/280,337

(22) PCT Filed: Feb. 20, 2007

(86) PCT No.: PCT/EP2007/051618

§ 371 (c)(1),
(2), (4) Date: May 18, 2009

(87) PCT Pub. No.: WO2007/096357

PCT Pub. Date: Aug. 30, 2007

(65) Prior Publication Data

US 2009/0261081 A1 Oct. 22, 2009

(30) Foreign Application Priority Data

Feb. 23, 2006 (FR) ...................................... 06 50625

(51) Int. Cl.
*B23K 10/00* (2006.01)
*H05H 1/34* (2006.01)
*H05H 1/48* (2006.01)

(52) U.S. Cl.
CPC ................ *H05H 1/34* (2013.01); *H05H 1/48* (2013.01); *H05H 2001/3421* (2013.01)

(58) Field of Classification Search
CPC ..... H05H 1/48; H05H 1/34; H05H 2001/3421
USPC ...... 219/121.36, 121.52, 121.48, 75, 121.45, 219/121.39, 121.59; 313/231.41, 231.51; 315/111.21
See application file for complete search history.

(56) References Cited

U.S. PATENT DOCUMENTS

| | | | | | |
|---|---|---|---|---|---|
| 3,071,678 | A | | 1/1963 | Neely et al. | |
| 4,146,772 | A | | 3/1979 | Jelmoriini | |
| 4,289,949 | A | * | 9/1981 | Raaness et al. | 219/121.52 |
| 4,651,326 | A | * | 3/1987 | Hubweber et al. | 373/22 |
| 4,710,607 | A | * | 12/1987 | Wilhelmi et al. | 219/121.36 |
| 5,191,186 | A | * | 3/1993 | Crapo et al. | 219/76.16 |
| 5,210,392 | A | * | 5/1993 | Labrot et al. | 219/121.52 |
| 5,773,785 | A | * | 6/1998 | Takeuchi et al. | 219/121.44 |

(Continued)

FOREIGN PATENT DOCUMENTS

| | | | |
|---|---|---|---|
| DE | 108676 | A1 | 10/1974 |
| DE | 3542984 | A1 | 6/1987 |

(Continued)

OTHER PUBLICATIONS

International Search Report, PCT/EP2007/051618, dated Feb. 20, 2007.

*Primary Examiner* — Mark Paschall
(74) *Attorney, Agent, or Firm* — Nixon Peabody LLP; Khaled Shami

(57) ABSTRACT

A transferred-arc plasma torch comprising a sheath cooled using a cooling fluid and an electrode inserted in said sheath. The electrode is made of a consumable material and the torch comprises means to supply the electrode with this material so as to offset its erosion.

8 Claims, 2 Drawing Sheets

(56) References Cited

U.S. PATENT DOCUMENTS

| | | | | |
|---|---|---|---|---|
| 7,413,667 | B1 * | 8/2008 | Routberg et al. | 204/554 |
| 7,807,937 | B2 * | 10/2010 | Schneider | 219/121.54 |
| 7,867,457 | B2 * | 1/2011 | Gutsol et al. | 422/186.21 |
| 2005/0077273 | A1 * | 4/2005 | Matus et al. | 219/121.54 |

FOREIGN PATENT DOCUMENTS

| | | | |
|---|---|---|---|
| EP | 0326318 | A2 | 8/1989 |
| EP | 0706308 | A1 | 4/1996 |
| WO | 01/78471 | A1 | 10/2001 |

* cited by examiner

TRANSFERRED-ARC PLASMA TORCH

CROSS REFERENCE TO RELATED APPLICATIONS OR PRIORITY CLAIM

This application is a national phase of International Application No. PCT/EP2007/051618, entitled "TRANSFERRED-ARC PLASMA TORCH", which was filed on Feb. 20, 2007, and which claims priority of French Patent Application No. 06 50625, filed Feb. 23, 2006.

TECHNICAL FIELD

The present invention concerns the field of plasma torches, and more particularly transferred-arc plasma torches.

BACKGROUND OF THE INVENTION

Plasma torches are used to treat matter (solid, liquid or gas) at very high temperatures in a controlled-reactivity atmosphere. Plasma torches are traditionally used in particular in welding, marking, thermal spray and waste treatment.

Plasma is a gas in ionized state, traditionally considered to be a fourth state of matter. To obtain the ionization of a gas at atmospheric pressure, plasma torches are used. These contribute the energy needed for ionization of the gas using an electromagnetic wave (radio frequency or microwave) or an electric arc. We are only considering arc torches here, which constitute the only technology making it possible to reach significant operating powers.

Arc torches are classified into two categories: sprayed-arc torches and transferred-arc torches. In the case of sprayed-arc torches, the two electrodes making it possible to establish the arc are contained in the torch and the arc is therefore confined therein. The plasma plume created by the passage of a gas in the arc is ejected outside the torch. In the case of transferred-arc torches, the torch comprises only one electrode and the arc is established between the torch and another material serving as counter-electrode. Examples of sprayed-arc torches and transferred-arc torches are described in application EP-A-706308.

Two transferred-arc torches can be used together in order to maintain an arc between them, one serving as cathode and the other as anode. This device is known under the name "twin torches".

One example of twin torches is described in application EP-A-1281296.

Regardless of the arc torch technology implemented, the main problem remains the short lifespan of the electrodes.

For several years, a number of research projects have essentially related to improving the lifespan of plasma torch electrodes through the choice of material for the electrodes. These electrodes are classified into two categories: so-called "hot" electrodes, made in a refractory material with a high boiling or sublimation point such as tungsten and zirconium, and so-called "cold" electrodes, made in a material with a low boiling point and strong heat conductivity such as copper. Regardless of the type of material used, the electrode is subject to wear via erosion.

Different technological solutions have been developed to decrease the speed of wear of the electrodes: doping of the tungsten with thorium, machining of the end of the electrode, etc. The need to cool the electrode itself through internal water circulation quickly appeared and had the main result of making the architecture of the torches more complex, the presence of two or even three separate cooling circuits hardly being compatible with systems of limited size like thermal plasma torches. Moreover, maintenance and replacement operations for the electrodes are made difficult by the need to first disconnect the connections of the cooling circuits.

It is also known in a field distant from that of plasma torches, i.e. aluminum electrolysis or the steel industry, to use consumable electrodes, existing in the form of a simple solid graphite cylinder. However, the only possible applications of these electrodes are in a reducing gaseous atmosphere, as in an oxidizing atmosphere, the combustion of the graphite would lead to rapid erosion of these.

The aim of the present invention is to provide a transferred-arc plasma torch having the same properties for use as cooled-electrode plasma torches but without having the drawbacks thereof, in particular in terms of bulk and the complexity of assembly and maintenance.

SUMMARY OF THE INVENTION

The present invention is defined as a transferred-arc plasma torch comprising a sheath cooled using a cooling fluid and an electrode inserted into said sheath, said electrode being made of a consumable material and the torch comprising means to supply the electrode with this material so as to offset its erosion.

Thus it is not necessary to provide an additional cooling circuit to cool the electrode.

According to one embodiment, the means to supply the electrode with material comprise means for automatically advancing the electrode toward the distal end of the torch. One can in particular provide rollers causing the electrode to advance via friction toward the distal end of the torch.

Advantageously, the torch comprises gas cladding means ensuring the cladding of said electrode by a neutral and plasmagene gas inside said sheath.

In this way, the erosion of the electrode will be considerably slowed and its lifespan prolonged. The gas cladding means ensure sweeping of the electrode by said gas and its diffusion to the distal end of the electrode so as to optimize the protection.

The sheath may comprise conduits for admitting a secondary gas at its distal end, the torch comprising injection means connected to said admission conduits to inject a secondary gas downstream from the electrode. This compact arrangement makes it possible to obtain a plasma of the desired composition downstream from the electrode.

Advantageously, the plasma torch comprises a fixed torch body supporting the assembly of gas, cooling fluid and electric supply connections. The sheath has a tubular part integral with a torch head and goes completely through it, the torch head resting on said torch body and cooperating with it to ensure the continuity of the gas, cooling fluid and electrical supply circuits between said connections and said sheath.

In this way, it is not necessary to disassemble the gas, cooling fluid and electrical supply connections during an electrode change.

Typically, the tubular part of the sheath comprises two concentric envelopes defining a cavity connected to the cooling circuit.

Moreover, a guide and maintenance device can be provided so as to position the torch head on said body in a predetermined position and fix it to said body in this position. The assembly and disassembly will thus be made easier and one will in particular avoid sealing problems resulting from an alignment defect between the torch body and head.

The electrical supply of the electrode is provided by at least one metallic wire brush mounted on the head of the torch and bearing on the surface of the electrode through the action of a spring. Here again, the assembly and disassembly of the electrode will be made easier as a result.

BRIEF DESCRIPTION OF THE DRAWINGS

Other characteristics and advantages of the invention will appear upon reading one preferred embodiment of the invention done in reference to the attached figures, in which.

DETAILED DESCRIPTION OF THE INVENTION

A first idea at the basis of the invention is to provide a consumable electrode continuously supplied with material. A second idea at the basis of the invention is to protect this electrode through a cladding of neutral gas in the sheath.

The invention will advantageously be used for the realization of twin plasma torches, one serving as anode and the other as cathode. However, these two torches being structurally identical, only one will be described.

Figure 1:
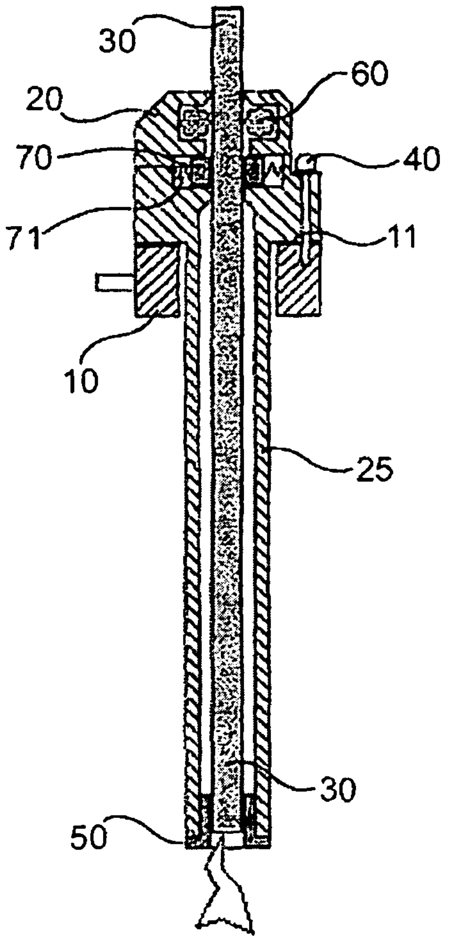
FIG. 1 is a diagrammatic illustration of a transferred-arc plasma torch according to the invention.

FIG. 1 shows a transferred-arc plasma torch according to the invention. It comprises a support 10 called torch body, a sheath 25, preferably metallic, having a tubular part integral in its upper part with a torch head 20, a consumable electrode 30 for example a graphite electrode, a guide and maintenance device 40, a diffuser 50, a device for advancing the electrode 60, electrical connection means to the electrode by brush 70.

The torch body 10 constitutes the fixed part of the torch which is never disassembled and supports all of the connector technology with the fluid, gas and supply circuits. The connections are the admission and discharge of cooling water for the head and the sheath, the admission of plasmagene gas, the admission of secondary gas and the electrical supply. The torch body comprises, in its upper part, a plate 11 to which the gas and cooling fluid circuits and electrical connections lead.

The torch head 20 is mounted on the plate 11 of the torch body using a guide and maintenance device 40. This device ensures the guiding and fixing of the torch head on the torch body in a predetermined position. Guiding is provided by a guide post or centering device on the support body or a combination of these means. Maintenance is, for example, done using a rapid fixing mechanism. The continuity of the fluid and gas circuits between the support body 10 and the torch head 20 is ensured by suitable sealing systems, for example using joints, in particular O-rings, or any other special connection means at the plate 11.

The cylindrical graphite electrode 30 goes completely through the torch head and extends into the sheath. Its electrical supply is done by a wire brush contact 70 pushed on the electrode by a spring 71. Means are provided to enable the supply of the electrode with consumable material, for example using automatic advancement means placed at the torch head. These advancement means are, for example, motorized rollers 60 with adjustable speed, bearing on the electrode, in diametrically opposite places and causing the electrode to advance via friction toward the distal end of the torch.

In this way, when the torch head must be disassembled, only the maintenance system 40 has to be manipulated, which makes it possible to release the torch head 20 from the torch body 10, simply by lifting it vertically from the plate. One sees here the interest of being able to detach all of the mechanical part of the torch without having to disconnect the fluid and gas circuits from the torch body 10.

Figure 2:
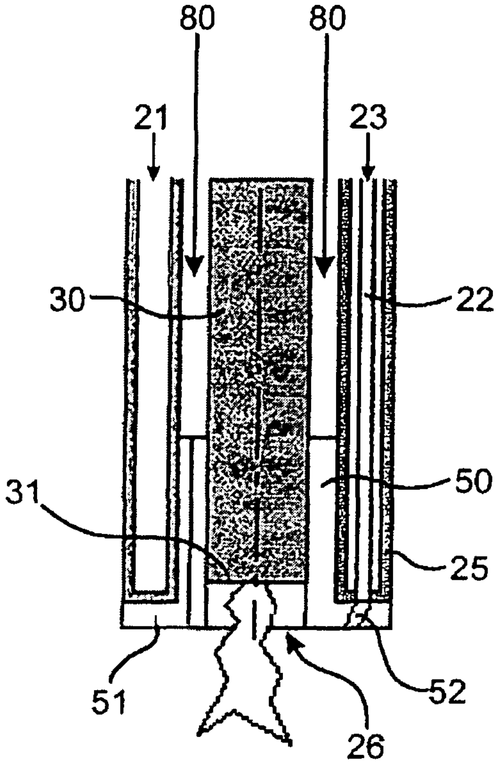
FIG. 2 illustrates a detail of a transferred-arc plasma torch according to the invention.

FIG. 2 more precisely describes the end of the torch head according to the invention.

As previously indicated, the electrode 30 is protected by the sheath 25 and the torch head 20. The distal end 31 of the electrode is advantageously located back in relation to the nose 26 of the torch. The sheath is cooled by internal circulation of a cooling fluid 21, for example, water. The sheath has a tubular shape with two concentric envelopes, the cooling fluid circulating in the cavity defined by these two envelopes. Moreover, conduits 22 arranged inside the cavity enable the admission of the secondary gas 23 up to the distal end of the torch.

The plasma torch comprises gas cladding means suited to maintaining a cladding of neutral and protective gas around the electrode. This neutral gas is also used to generate the plasma. More precisely, the gas cladding means ensure not only the sweeping of the electrode by the neutral gas, but also the diffusion of this gas at its distal or active end. In this way, the electrode is protected from the outside environment, in particular if it is oxidizing.

The gas cladding means comprise the gas supply circuit and the diffuser 50. In fact, said diffuser serves several functions: in addition to the circulation of plasmagene neutral gas 80 between the electrode 30 and the sheath 25 and its diffusion to the active end of the electrode, it ensures the coaxial centering of the electrode 30 relative to the sheath 25 as well as their mutual electrical isolation. The diffuser 50 may take the form of an insulating ring provided with a clamp 51 at its lower part. The insulating ring is kept in the sheath 25 by a metallic spring retaining ring or any equivalent clipping system. The interior diameter of the ring is chosen so as to maintain the sheath in slight overpressure and to ensure sweeping of the electrode 30 by the neutral and plasmagene gas. Moreover, the clamp is gone through by nozzles 52 supplied by the admission pipe(s) 22 for the secondary gas such that the secondary gas is injected into the plasma area downstream from the electrode.

It should be noted that the plasmagene gas enables the creation of a plasma with a stable arc while the secondary gas makes it possible to obtain a plasma having the desired chemical composition or physical properties. Advantageously, one will use argon as the plasmagene neutral gas and oxygen as the secondary gas.

Such a system can be used in all applications requiring the generation of a plasma, and in particular in the field of waste treatment.

The invention claimed is:

1. A transferred-arc plasma torch comprising a sheath cooled using a cooling fluid and an electrode inserted in said sheath, characterized in that said electrode, configured to generate the plasma, is made of a consumable material and in that the torch comprises means to supply the electrode with this material so as to offset its erosion, and wherein a fixed torch body supports an assembly of gas, cooling fluid and electrical supply connection, and the electrode is electrically supplied using at least one wire brush mounted on the head of the torch and bearing on the surface of the electrode.

2. The plasma torch according to claim 1, characterized in that the means to supply the electrode with material comprise means for automatically advancing the electrode toward the distal end of the torch.

3. The plasma torch according to claim 1, characterized in that it comprises gas cladding means ensuring the cladding of said electrode by a neutral and plasmagene gas inside said sheath.

4. The plasma torch according to claim 3, characterized in that the gas cladding means ensure the sweeping of the electrode by said gas and its diffusion to the distal end of the electrode.

5. The plasma torch according to claim 4, characterized in that the sheath comprises admission conduits for a secondary gas at its distal end and in that the torch comprises injection means connected to said admission conduits ensuring the injection of the secondary gas downstream from the electrode.

6. The plasma torch according to claim 1, characterized in that the sheath has a tubular part integral with a torch head, the sheath going completely through the torch body, the torch head resting on said torch body and cooperating with it to ensure the continuity of the gas, cooling fluid and electrical supply circuits between said connections and said sheath.

7. The plasma torch according to claim 6, characterized in that said tubular part has two concentric envelopes defining a cavity connected to the cooling circuit.

8. The plasma torch according to claim 6, characterized in that it comprises a guide and maintenance device to position the torch head on said body in a predetermined position and fix it to said body in this position.

* * * * *